United States Patent
Link et al.

(10) Patent No.: US 9,273,648 B2
(45) Date of Patent: Mar. 1, 2016

(54) AIR INTAKE SYSTEM FOR A WORK VEHICLE

(71) Applicant: CNH America LLc, New Holland, PA (US)

(72) Inventors: John F. Link, Calumet City, IL (US); Lorenzo Gomez, Darien, IL (US); Richard L. Schempp, Northbrook, IL (US); William L. Schroeder, Downers Grove, IL (US); Thomas Chlystek, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/951,854

(22) Filed: Jul. 26, 2013

(65) Prior Publication Data

US 2015/0027311 A1    Jan. 29, 2015

(51) Int. Cl.
*F02M 35/08* (2006.01)
*B01D 46/00* (2006.01)
*F02M 35/10* (2006.01)

(52) U.S. Cl.
CPC ......... *F02M 35/086* (2013.01); *B01D 46/0067* (2013.01); *B01D 46/0068* (2013.01); *F02M 35/08* (2013.01); *F02M 35/10255* (2013.01); *F02M 35/10262* (2013.01)

(58) Field of Classification Search
CPC ....... B01D 50/00; E01H 1/0872; E01H 1/053
USPC .............. 95/280; 60/274, 295, 296, 300, 303, 60/311, 279, 288
See application file for complete search history.

(56) References Cited

U.S. PATENT DOCUMENTS

| | | | |
|---|---|---|---|
| 4,020,815 A * | 5/1977 | Hubert | 123/142.5 R |
| 4,359,330 A | 11/1982 | Copley | |
| 4,514,193 A | 4/1985 | Booth | |
| 4,904,126 A * | 2/1990 | Voith | 406/39 |
| 5,253,476 A * | 10/1993 | Levendis et al. | 60/279 |
| 5,575,826 A | 11/1996 | Gillingham et al. | |
| 5,613,992 A | 3/1997 | Engel | |
| 5,853,438 A * | 12/1998 | Igarashi | 55/302 |
| 5,930,994 A * | 8/1999 | Shimato et al. | 60/274 |
| 6,800,117 B2 | 10/2004 | Barris et al. | |
| 8,262,762 B2 | 9/2012 | Olson et al. | |
| 2005/0178111 A1 | 8/2005 | Kammel | |
| 2006/0112825 A1* | 6/2006 | Renwart et al. | 95/273 |

(Continued)

FOREIGN PATENT DOCUMENTS

WO    WO 8201325 A1    4/1982

*Primary Examiner* — Duane Smith
*Assistant Examiner* — Minh-Chau Pham
(74) *Attorney, Agent, or Firm* — Sue C. Watson (57) ABSTRACT

An air intake system for a work vehicle may include a filter assembly having a pre-cleaner and an air filter. The filter assembly may define at least one outlet port. The air intake system may also include an air valve movable between an opened position and a closed position and a blower coupled to the outlet port via a conduit. The blower may be configured to create a vacuum within the conduit such that particulates are removed from the filter assembly through the outlet port. When the air valve is in the opened position, an airflow may be directed through the filter assembly in an intake direction from the pre-cleaner through the air filter and, when the air valve is in the closed position, the airflow may be directed through the air filter in a reverse direction.

19 Claims, 9 Drawing Sheets

(56) References Cited

U.S. PATENT DOCUMENTS

| | | | |
|---|---|---|---|
| 2009/0113856 A1* | 5/2009 | Cooper et al. | 55/283 |
| 2009/0183496 A1* | 7/2009 | Arakawa et al. | 60/286 |
| 2010/0023233 A1* | 1/2010 | Utke et al. | 701/70 |
| 2010/0071978 A1 | 3/2010 | Kisse | |
| 2011/0011042 A1 | 1/2011 | Gillingham et al. | |
| 2012/0110985 A1* | 5/2012 | McCombs et al. | 60/287 |
| 2012/0272630 A1 | 11/2012 | James | |
| 2015/0017901 A1* | 1/2015 | Pfohl et al. | 454/141 |

* cited by examiner

AIR INTAKE SYSTEM FOR A WORK VEHICLE

FIELD OF THE INVENTION

The present subject matter relates generally to work vehicles and, more particularly, to an air intake system for a work vehicle that is configured to aspirate a filter assembly of the air intake system during a normal operating mode and removed trapped particulates within the filter assembly during a cleaning mode.

BACKGROUND OF THE INVENTION

Work vehicles typically include internal combustion engines that require clean air for use within the combustion process. Since many work vehicles, such as tractors and other agricultural vehicles, operate in fields and other harvesting environments in which the ambient air contains large amounts of dust, plant material and other particulates, an air intake system having an effective filter assembly is required. For example, conventional filter assemblies for work vehicles typically include a vortex or cyclone pre-cleaner configured to separate large particulates from the intake air and a porous air filter downstream of the pre-cleaner to provide the final stage of filtering prior to delivering the air into the engine.

To prevent the air filter from clogging, the large particulates separated from the intake air by the pre-cleaner must be removed from the filter assembly. Typically, such particulates are removed from the filter assembly via an outlet duct using a vacuum generated by the exhaust flow from the engine. However, the vacuum generated by the exhaust flow is often insufficient to meet the performance requirements of the filter assembly, thereby causing the air filter to plug within a short period of time.

To address these issues, U.S. Pat. Pub. No. 2011/0072769 (Vladaj et al), entitled "Air Intake System," discloses an air intake system including a fan module mounted directly to the filter assembly which is dedicated to delivering a vacuum that sucks large particulates from the pre-cleaner. Specifically, the fan module includes a fan and a motor housed within a sleeve, with a rotational axis of the fan and the motor being concentrically aligned with a central axis of the sleeve. During operation, the large particulates are sucked from the pre-cleaner and flow through the sleeve along a flow path radially aligned with and extending parallel to the rotational axis of the fan and the motor. However, while such a system is capable of removing the larger particulates contained within the intake air, the smaller particulates not separated by the pre-cleaner typically flow downstream and become trapped within the air filter. As a result, the air filter will eventually become plugged and must be cleaned or otherwise replace.

Accordingly, an air intake system that is capable of both aspirating large particulates separated by the pre-cleaner and removing particulates trapped within the air filter would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to an air intake system for a work vehicle. The air intake system may include a filter assembly having a pre-cleaner and an air filter. The filter assembly may define at least one outlet port. The air intake system may also include an air valve movable between an opened position and a closed position and a blower coupled to the outlet port via a conduit. The blower may be configured to create a vacuum within the conduit such that particulates are removed from the filter assembly through the outlet port. When the air valve is in the opened position, an airflow may be directed through the filter assembly in an intake direction from the pre-cleaner through the air filter and, when the air valve is in the closed position, the airflow may be directed through the air filter in a reverse direction.

In another aspect, the present subject matter is directed to a method for operating an air intake system for a work vehicle. The air intake system may include a filter assembly having a pre-cleaner and an air filter and an air valve movable between an opened position and closed position. The air intake system may also include a blower in fluid communication with at least one outlet port defined in the filter assembly. The method may generally include moving the air valve to the opened position when an engine of the work vehicle is running such that an airflow is directed in an intake direction through the filter assembly and into the engine, generating a vacuum with the blower such that particulates separated from the airflow within the pre-cleaner are expelled from the filter assembly through the at least one outlet port, continuing to operate the blower once the engine is shut down and moving the air valve to the closed position such that the airflow is directed in a reverse direction through the filter assembly and into the at least one outlet port.

In a further aspect, the present subject matter is directed to a work vehicle including an engine and an air intake system configured to supply clean air to the engine. The air intake system may include a filter assembly having a pre-cleaner and an air filter. The filter assembly may define at least one outlet port. The air intake system may also include an air valve movable between an opened position and a closed position and a blower coupled to the outlet port via a conduit. The blower may be configured to create a vacuum within the conduit such that particulates are removed from the filter assembly through the outlet port. When the air valve is in the opened position, an airflow may be directed through the filter assembly in an intake direction from the pre-cleaner through the air filter towards the engine and, when the air valve is in the closed position, the airflow may be directed through the air filter in a reverse direction away from the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an air intake system for a work vehicle. Specifically, the air intake system may include a filter assembly having a pre-cleaner configured to separate large particulates from the air flowing into the system and an air filter disposed downstream of the pre-cleaner. In addition, the air intake system may include a blower generating a vacuum configured to suck particulates from the filter assembly and an air valve configured to regulate the flow of air through the filter assembly. In several embodiments, the air intake system may be configured to operate in a normal mode when an engine of the work vehicle is running and a cleaning mode when the engine is shut down. In the normal operating mode, the air valve is moved to an opened position such that intake air is directed through the filter assembly and cleaned/filtered by the pre-cleaner and air filter. The cleaned/filtered air is then directed to the engine while any large particulates separated by the pre-cleaner are evacuated from the filter assembly via the vacuum generated by the blower. In the cleaning mode, the air valve is moved to a closed position such that the vacuum generated by the blower may be used to remove particulates trapped within the filter assembly, particularly within the air filter. For instance, when the air valve is closed, the flow of air through the filter assembly may be reversed such that particulates trapped along an upstream side of the air filter (i.e., the side closest to the pre-cleaner) may be knocked loose and removed from the filter assembly.

It should be appreciated that, in several embodiments of the present subject matter, the air intake system may only be configured to temporarily operate in the disclosed cleaning mode. For example, upon shutdown of the engine and movement of the air valve to the closed position, the blower may be configured to operate (e.g., via electronic control) for a given amount of time to allow the filter assembly to be cleaned. The specific amount of time that the blower is operated after the engine is shutdown may generally vary depending on the configuration of the filter assembly and the desired cleaning results. For instance, the blower may be operated for a matter of seconds or minutes after the engine is shutdown. Thereafter, the blower may be turned off to complete the disclosed cleaning mode.

Figure 1:
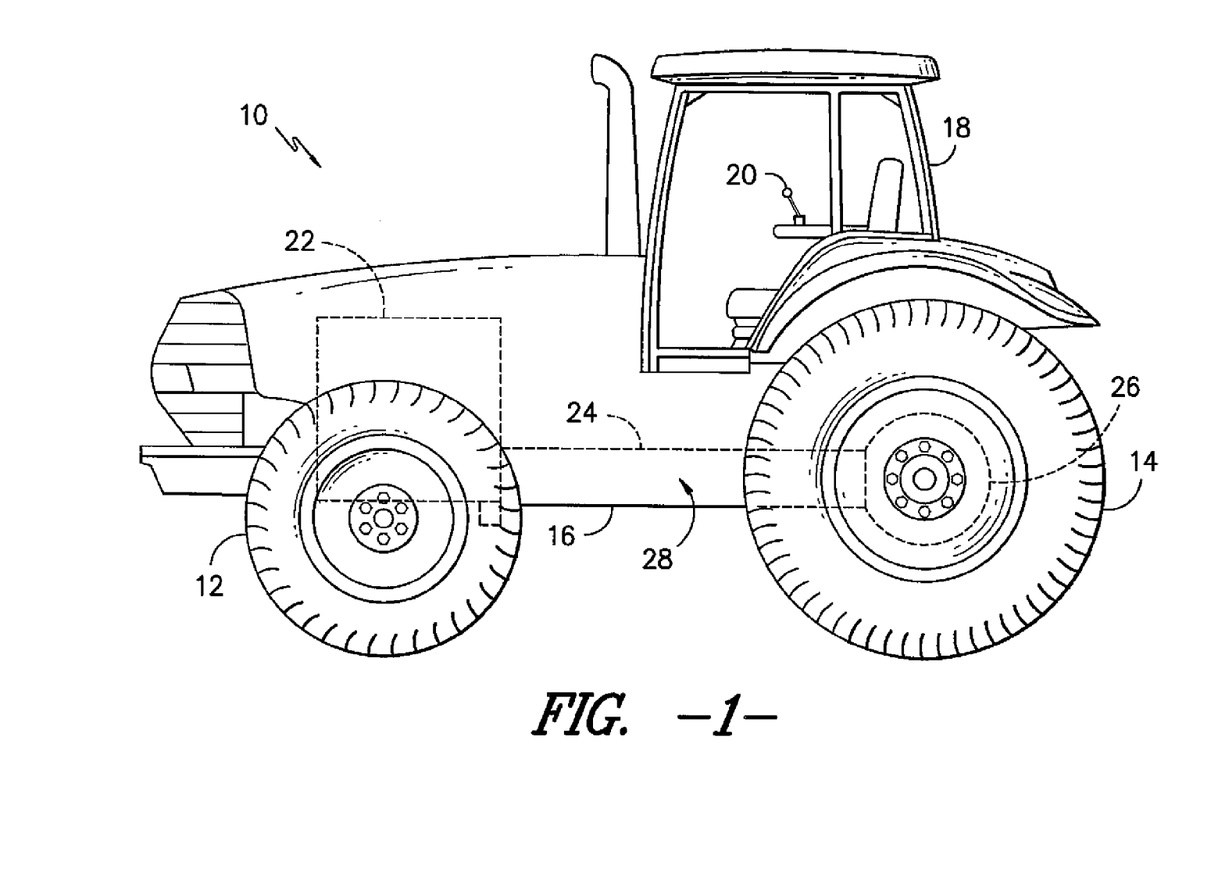
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, road vehicles, loaders and/or the like.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control devices 20 (e.g., levers, pedals, control panels and/or the like) for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a differential 26. The engine 22, transmission 24, and differential 26 may collectively define a drive train 28 of the work vehicle 10.

Figure 2:
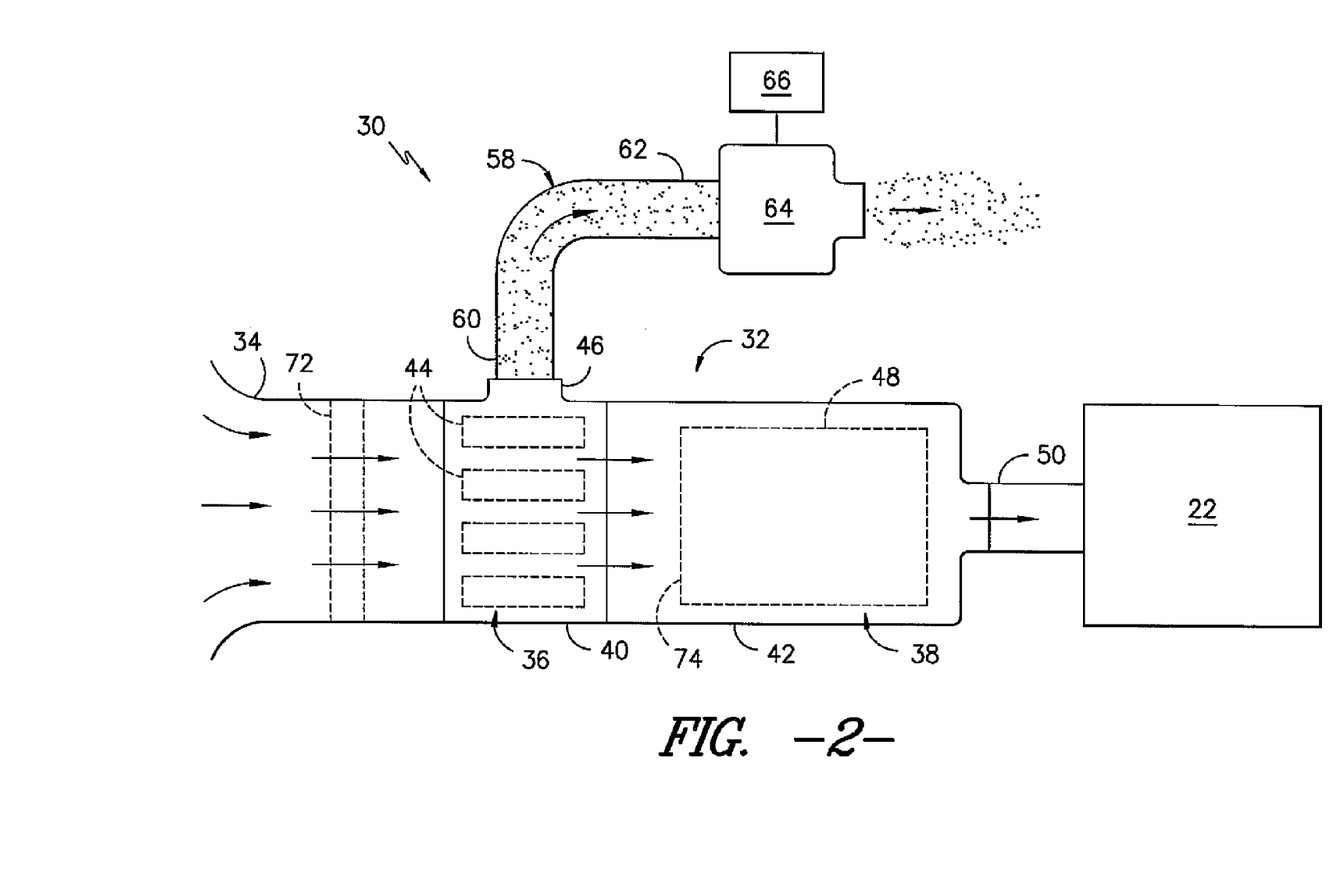
FIG. 2 illustrates a simplified, schematic view of one embodiment of an air intake system suitable for use with the work vehicle shown in FIG. 1, particularly illustrating the system operating in a normal mode in accordance with aspects of the present subject matter.
Figure 3:
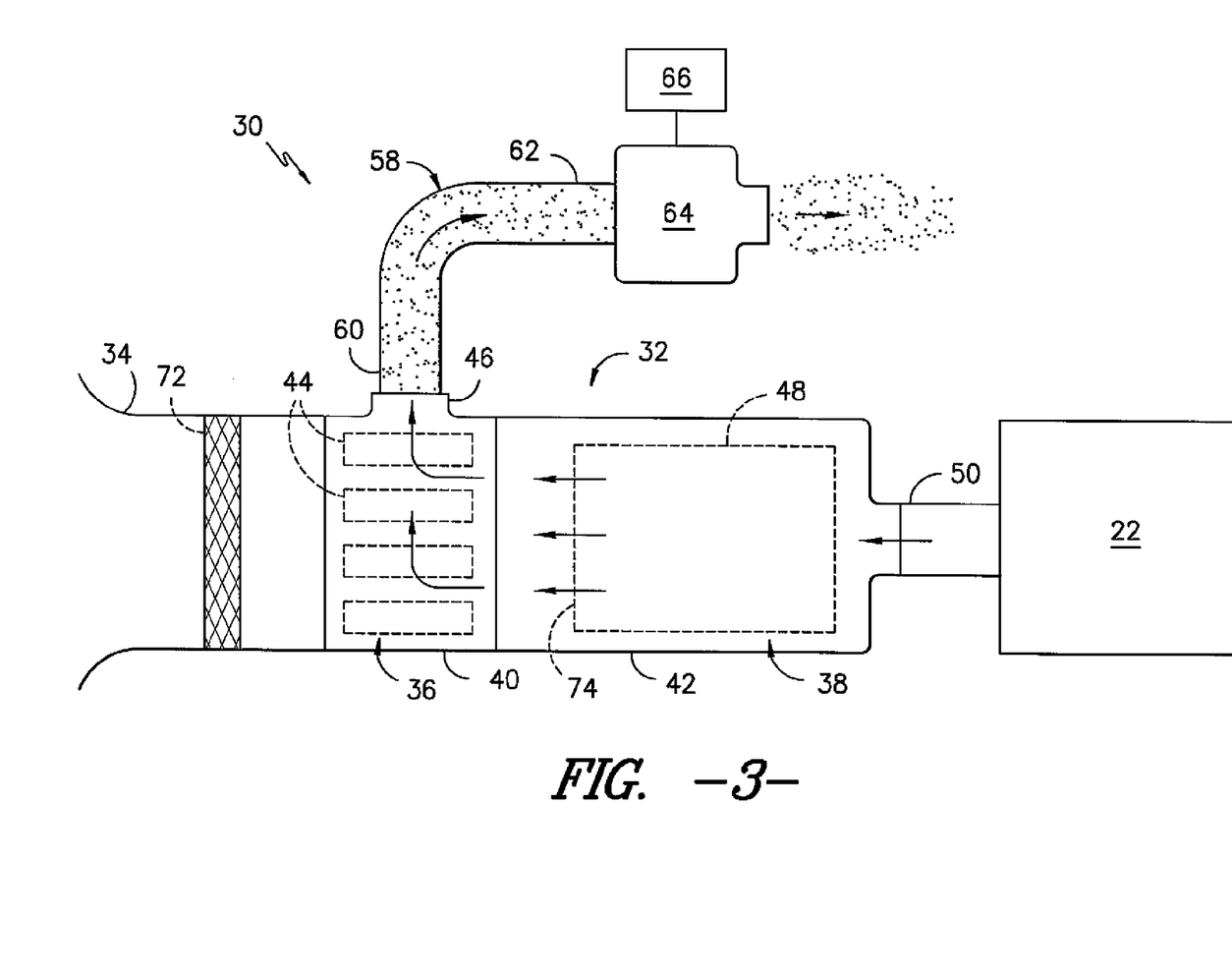
FIG. 3 illustrates another schematic view of the air intake system shown in FIG. 2, particularly illustrating the system operating in a cleaning mode in accordance with aspects of the present subject matter.
Figure 4:
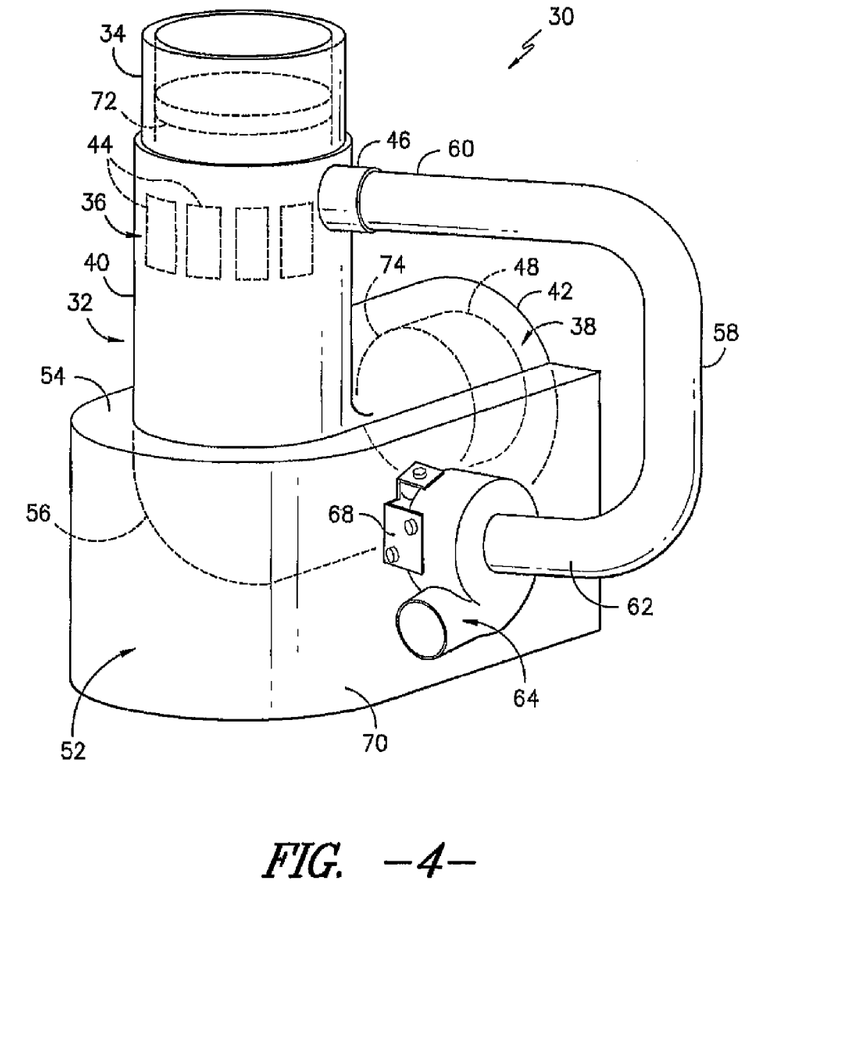
FIG. 4 illustrates a perspective view of one embodiment of a suitable configuration of the air intake system shown in FIGS. 2 and 3.

Referring now to FIGS. 2-4, several views of an air intake system 30 suitable for use with the work vehicle 10 shown in FIG. 1 is illustrated in accordance with aspects of the present subject matter. Specifically, FIG. 2 illustrates a schematic diagram of one embodiment of the air intake system 30 while operating in a normal mode (i.e., cleaning/filtering air as it is supplied to the engine 22) and FIG. 3 illustrates a schematic diagram of the air intake system 30 while operating in a cleaning mode in accordance with aspects of the present subject matter. Additionally, FIG. 4 illustrates a perspective view of a specific embodiment of the air intake system 30 shown in FIGS. 2 and 3.

As shown, the air intake system 30 may generally include a filter assembly 32 configured to receive dirty air from an intake duct 34 and clean/filter such air for subsequent delivery to the engine 22. In general, the filter assembly 32 may include a pre-cleaner 36 and an air filter 38 disposed downstream of the pre-cleaner 36. In addition, the filter assembly 32 may include a pre-cleaner housing 40 configured to encase the pre-cleaner 36 and a filter housing 42 configured to encase the air filter 38. It should be appreciated that the pre-cleaner housing 40 and the filter housing 42 may be formed integrally with one another (e.g., by forming both housings 40, 42 as a single continuous housing) or the pre-cleaner housing 40 and the filter housing 42 may comprise separate components configured to be separately coupled to one another As is generally understood, the pre-cleaner 36 may be configured to remove portions of the dust, dirt, debris, plant matter and other particulates contained within the air flowing into the filter assembly 32 via the intake duct 34. Specifically, in several embodiments, the pre-cleaner 36 may include one or more tubes (e.g., turbo tubes), dirt separators, and/or any other suitable pre-cleaner elements 44 configured to separate large particulates from the air via centripetal force. For example, the pre-cleaner element(s) 44 may be configured to impart a vortex or spinning motion to the flow of air entering the filter assembly 32. As a result, the large particulates contained within the air may be forced radially outwardly along the inner wall of the pre-cleaner housing 40 by the centripetal force of the vortex/spinning motion. Such particulates may then be expelled from the filter assembly 32 via an outlet port 46 defined through the pre-cleaner housing 40 along the outer perimeter of the pre-cleaner 36.

Additionally, the air filter 38 may generally be configured to receive the cleaned air flowing from the pre-cleaner 36 and filter such air to provide a final stage of filtering prior to delivery of the air to the engine 22. Thus, as shown in the illustrated embodiment, the air filter 38 may generally include one or more filter elements 48 configured to catch or trap the remaining particulates contained within the cleaned air. For instance, in several embodiments, the filter element(s) 48 may be made from a fibrous, porous or mesh material that allows air to pass therethrough while catching/trapping any particulates. The cleaned/filtered air may then be directed through a suitable conduit 50 to the engine 22, where the air may be mixed with fuel and combusted.

As particularly shown in FIG. 4, in several embodiments, the pre-cleaner housing 40 and the filter housing 42 may be oriented generally perpendicularly to one another such that the filter assembly 32 generally defines an "L" shape. As such, the air flowing into the intake duct 34 may be directed generally vertically downward through the pre-cleaner 36 and then generally horizontally through the air filter 38. However, in other embodiments, the pre-cleaner housing 40 and the filter housing 42 may have any other suitable orientation relative to one another. For example, in another embodiment, the pre-cleaner housing 40 and the filter housing 42 may be aligned along a common axis such that air flowing through the filter assembly 32 is directed continuously along such axis (e.g., similar to the schematic view of the filter assembly 32 shown in FIGS. 2 and 3).

Additionally, as shown in FIG. 4, in several embodiments, the filter assembly 32 may be coupled to or otherwise supported by a fuel tank 52 of the work vehicle 10. For example, the fuel tank 52 may be molded or otherwise formed so as to define a recessed feature configured to receive a portion of the filter assembly 32. Specifically, as shown in the illustrated embodiment, a top 54 of the fuel tank 52 may define a semi-circular recessed feature 56 such that a portion of the cylindrical filter housing 42 and/or pre-cleaner housing 40 may be received within the recessed feature 56. However, in another embodiment, the filter assembly 32 may simply be coupled to the fuel tank 52 without being received within any type of recessed feature 56. Moreover, in alternative embodiments, the filter assembly 32 may be disposed at any other suitable location on and/or within the work vehicle 10 and, thus, may be coupled to and/or supported by any other suitable component of the work vehicle 10.

Referring still to FIGS. 2-4, the disclosed air intake system 30 may also include a conduit 58 having an upstream end 60 in fluid communication with the outlet port 46 and a downstream end 62 in fluid communication with a blower 64 configured to aspirate/clean the filter assembly 32. In general, the blower 64 may be configured to generate a vacuum within the conduit 58 that sucks particulates through the outlet port 46. The particulates may then be directed through the conduit 58 and expelled from the blower 64 back into the environment.

It should be appreciated that the conduit 58 may generally be any suitable elongated member or any combination of elongated members configured for the flow of air and/or fluid therethrough. For example, the conduit 58 may comprise one or more tubes, hoses, pipes, ducts and/or any other conduit-like members defining a passageway(s) for the flow of air/fluid.

It should also be appreciated that the blower 64 may generally be any suitable blower or aspirator known in the art that is capable of providing the functionality described herein. For instance, in several embodiments, the blower 64 may be an electric centrifugal blower (also referred to as a squirrel cage fan) or any other suitable blower, such as any suitable aspirator and/or vacuum pump. Additionally, in several embodiments, the blower 65 may be configured to be electronically controlled via a controller 66 of the work vehicle 10 (e.g., a computer and/or any other suitable processing device). For instance, the controller 66 may be a vehicle controller configured to control the operation of various components of the work vehicle 10, such as the engine 22, the transmission 24 and/or any other suitable components of the work vehicle or the controller 66 may simply be a blower controller configured specifically for controlling the operation of the blower 64. Regardless, the blower 64 may be communicatively coupled to the controller 66 such that operation of the blower 64 may be controlled automatically, such as by automatically turning the blower 64 on/off or by varying the speed of an electric motor associated with the blower 64.

Additionally, it should be appreciated that, in several embodiments the blower 64 may be coupled to or otherwise supported by the fuel tank 52 of the work vehicle 10. For example, as shown in FIG. 4, one or more suitable mounting brackets 68 may be coupled between a side 70 of the fuel tank 52 and the blower 64 to allow the blower 64 to be secured to and supported by the fuel tank 52. However, in alternative embodiments, the blower 64 may be disposed at any other suitable location on and/or within the work vehicle 10 and, thus, may be coupled to and/or supported by any other suitable component of the work vehicle 10.

Referring still to FIGS. 2-4, the air intake system 30 may also include an air valve 72 disposed upstream of the pre-cleaner 36. For example, as shown in the illustrated embodiment, the air valve 72 is positioned within the intake duct 34. However, in other embodiments, the air valve 72 may be positioned at any other suitable location upstream of the pre-cleaner 36, such as at a position within the pre-cleaner housing 40 that is upstream of the pre-cleaner element(s) 44. In general, the air valve 72 may be configured to regulate the flow of air through the filter assembly 32 and, thus, may be movable between an open position (FIG. 2) and a closed position (FIG. 3). For instance, as shown in FIG. 2, the air valve 72 may be moved to an open position to allow air to flow (as indicated by the arrows) from the intake duct 34 through the filter assembly 32 in an intake direction (i.e., such that air flows from the pre-cleaner 36 and through the air filter 38 towards the engine 22). However, as shown in FIG. 3, when moved to the closed position, the air valve 72 may entirely or substantially seal the intake duct 34 to prevent air from flowing from duct 34 through the filter assembly 32.

During normal operation (i.e., when the engine 22 is running), the air valve 72 may be maintained in the open position. Thus, as shown in FIG. 2, dirty air received within the intake duct 34 may flow into the filter assembly 32 to allow such air to be cleaned and filtered using the pre-cleaner 36 and the air filter 38. The cleaned/filtered air may then exit the filter assembly (e.g., via conduit 50) and flow into the engine 22. Additionally, due to the vacuum generated by the blower 64, any particulates flowing along the inner wall of the pre-cleaner housing 40 may be sucked out the outlet port 46 and through the conduit 58 for subsequent discharge into the outside environment.

Moreover, when the engine 22 of the work vehicle 10 is shutdown, the operation of the air intake system 30 may be switched to a cleaning mode in which the air valve 72 is moved to the closed position to allow any particulates trapped within the filter assembly 32 to be removed via the outlet port 46. Specifically, in several embodiments, the blower 64 may be operated for a given amount of time after the engine 22 is turned off to allow the filter assembly 32 to be cleaned. For example, as shown in FIG. 3, by closing the air valve 72 and continuing operation of the blower 64 after the engine 22 is shut down, the airflow through the filter assembly 32 may be reversed relative to the intake direction (i.e., by flowing away from the engine 22 through the air filter 38 and back towards the outlet port 46). As a result, particulates trapped within the air filter 38 (e.g., along an upstream side 74 of the air filter 38) and/or the pre-cleaner 36 may be knocked loose and evacuated from the filter assembly 32 via the outlet port 46.

Figure 5:
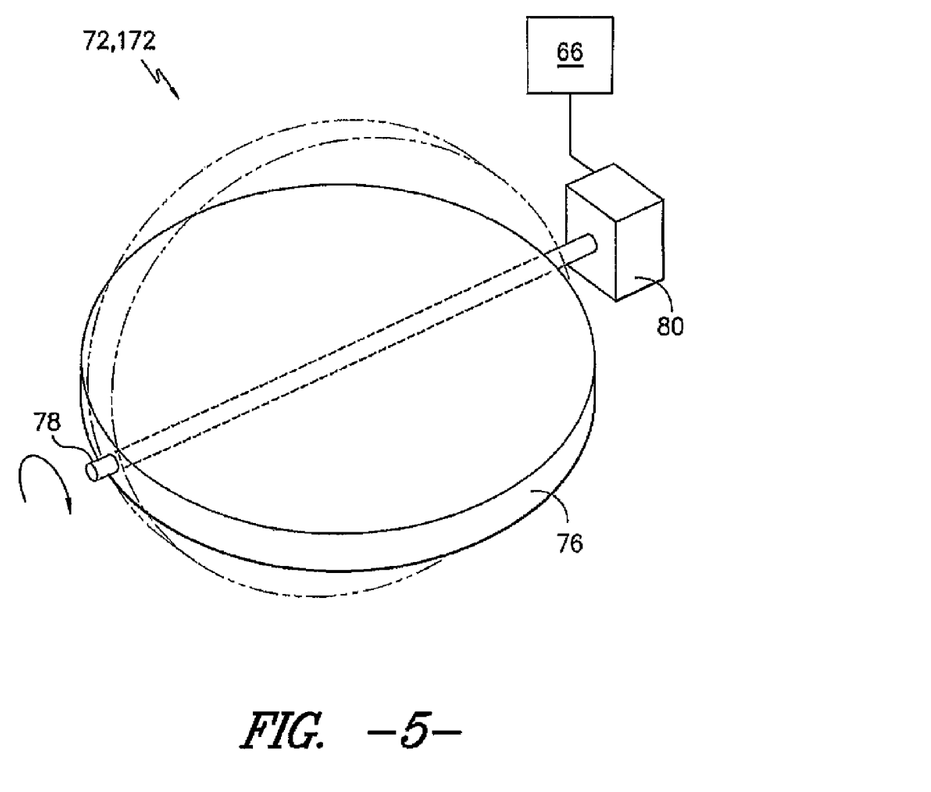
FIG. 5 illustrates a perspective view of one embodiment of a suitable air valve configuration in accordance with aspects of the present subject matter, particularly illustrating the air valve in a closed position (solid lines) and an open position (phantom lines)

It should be appreciated that the air valve 72 may generally have any suitable configuration that allows it to function as described herein. For example, FIG. 5 illustrates a perspective view of one embodiment of a suitable configuration for the disclosed air valve 72. As shown, the air valve 72 is configured as a butterfly valve and includes a disk shaped closing member 76 mounted on a rod or shaft 78. The closing member 76 may generally be configured to have dimensions corresponding to the dimensions of the component within which the air valve 72 is installed. For instance, in the illustrated embodiment, an outer diameter of the closing member 76 may be substantially the same as the inner diameter of the intake duct 34. Thus, by rotating the shaft 78, the closing member 76 may be moved between a closed position (shown in the solid lines), wherein the closing member 76 is sealed or substantially sealed against the inner perimeter of the intake duct 34 (or against any other component within which the air valve 72 is installed) and an open position (shown in the phantom lines), wherein the closing member 76 is angled away from the closed position (e.g., at 90 degrees relative to the closed position) to allow air to flow from the intake duct 34 through the filter assembly 32.

Figure 6:
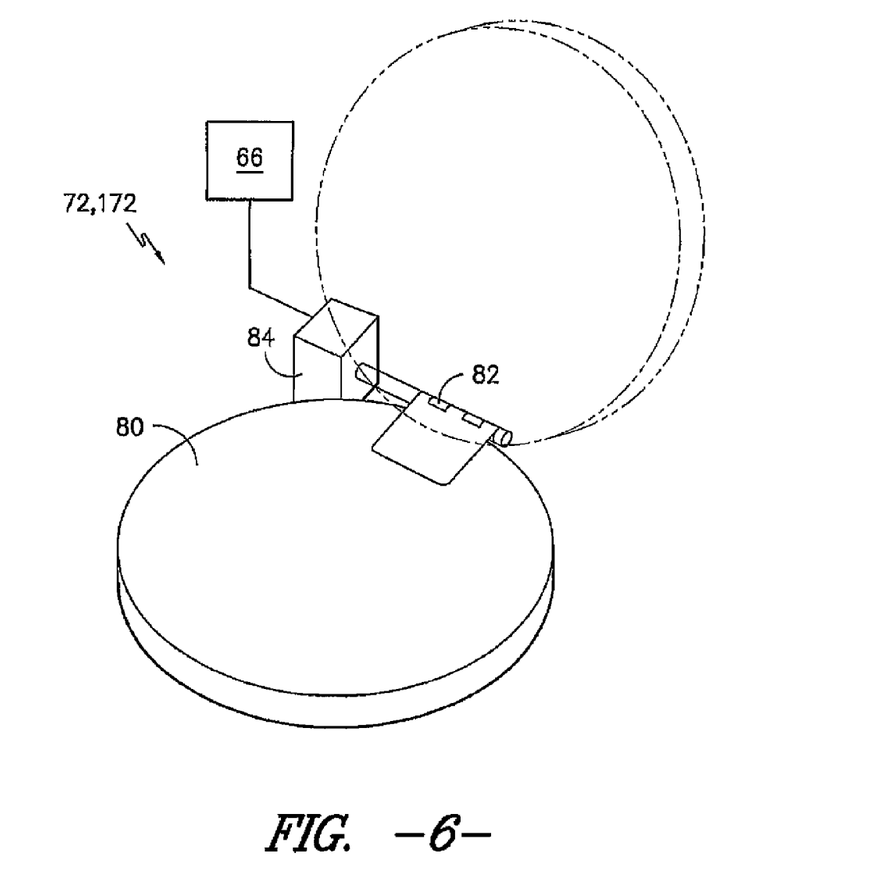
FIG. 6 illustrates a perspective view of another embodiment of a suitable air valve configuration in accordance with aspects of the present subject matter, particularly illustrating the air valve in a closed position (solid lines) and an open position (phantom lines)

Alternatively, FIG. 6 illustrates a perspective view of another embodiment of a suitable configuration for the disclosed air valve 72. As shown, the air valve 72 is configured as a flap valve and includes a disk shaped closing member 80 pivotally mounted to a pivot hinge 82. Similar to the embodiment described above, the closing member 80 may generally be configured to have dimensions corresponding to the dimensions of the component within which the air valve 72 is installed, such as by defining an outer diameter that is substantially the same as the inner diameter of the intake duct 34. Thus, by pivoting the closing member 80 up and down about the pivot hinge 82, the closing member 80 may be moved between a closed position (shown in the solid lines), wherein the closing member 80 is sealed or substantially sealed against the inner perimeter of the intake duct 34 (or against any other component within which the air valve 72 is installed) and an open position (shown in the phantom lines), wherein the closing member 80 is angled away from the closed position (e.g., at 90 degrees relative to the closed position) to allow air to flow from the intake duct 34 through the filter assembly 32.

It should be appreciated that, in further embodiments, the air valve 72 may have any other suitable configuration known in the art. Additionally, it should be appreciated that, in several embodiments, the closing member 76, 80 of the air valve 72 may be configured to be automatically moved between the open and closed positions using a suitable actuator 84, such as an electric motor or any other suitable actuation device. For instance, as shown in FIGS. 5 and 6, an actuator 84 may be coupled to the closing member 76, 80 (via the shaft 78 or the hinge pin 82) to allow the closing member 76, 80 to be automatically opened and closed. In such an embodiment, the actuator 84 may be electronically controlled via the controller 66. Thus, when the engine 22 of the work vehicle 10 is shutdown, the controller 66 may transmit a suitable control signal to the actuator 84 to cause the closing member 76, 80 to be moved to the closed position, thereby allowing the filter assembly 32 to be cleaned via the vacuum generated by the blower 64.

Figure 7:
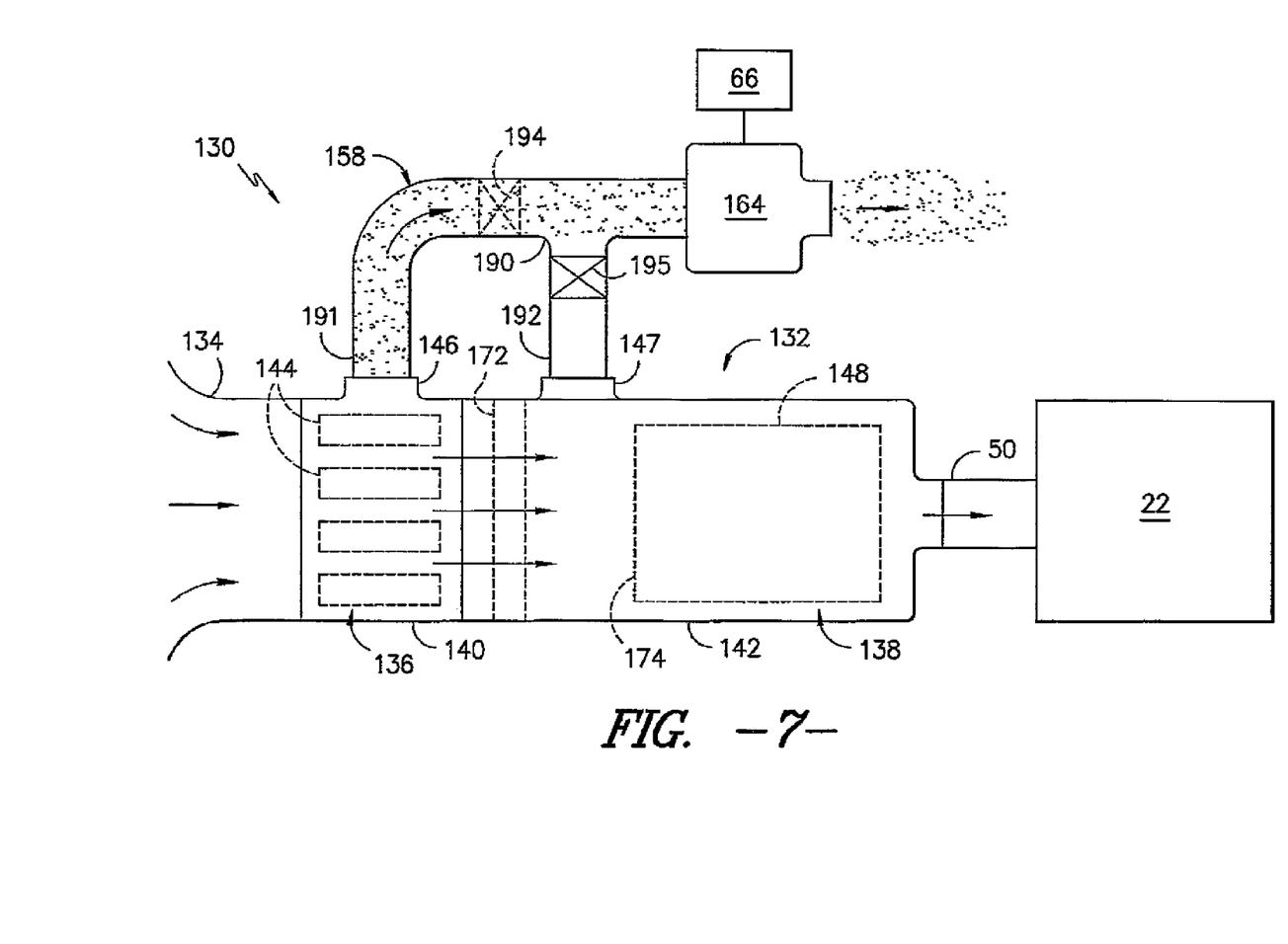
FIG. 7 illustrates a simplified, schematic view of another embodiment of an air intake system suitable for use with the work vehicle shown in FIG. 1, particularly illustrating the system operating in a normal mode in accordance with aspects of the present subject matter.
Figure 8:
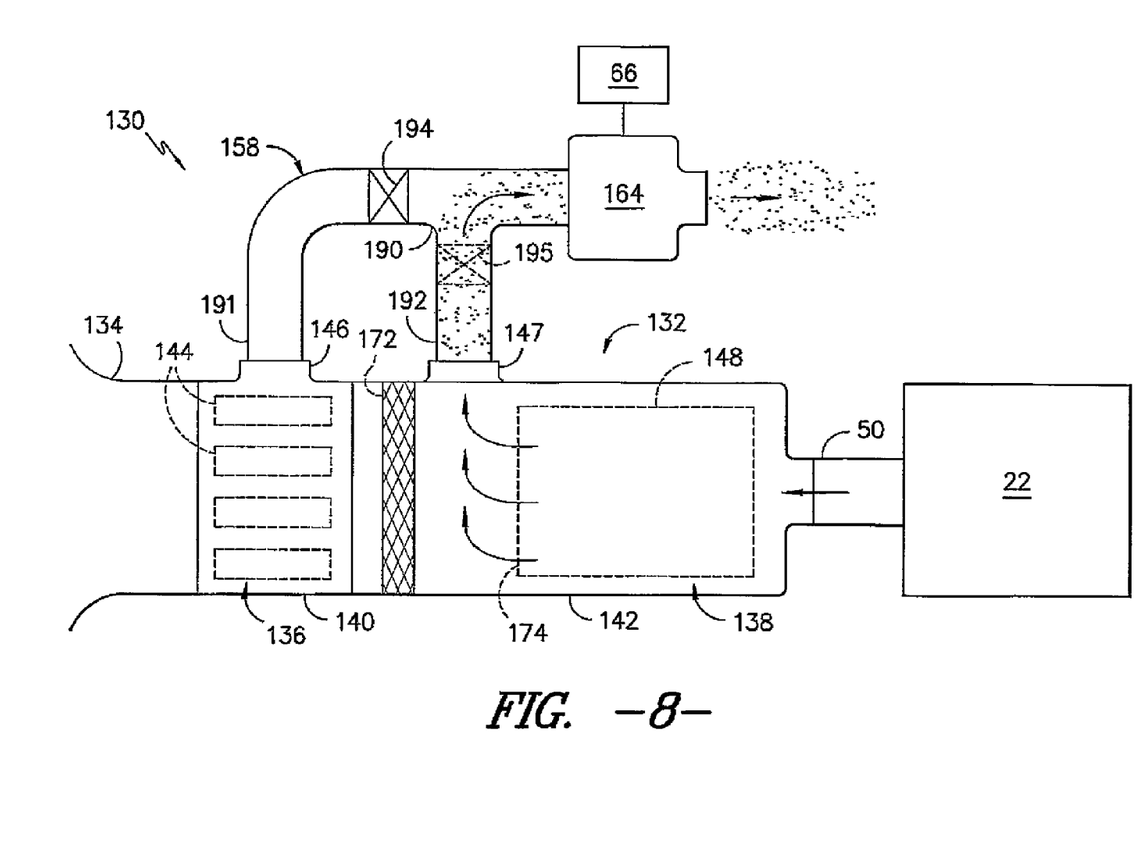
FIG. 8 illustrates another schematic view of the air intake system shown in FIG. 7, particularly illustrating the system operating in a cleaning mode in accordance with aspects of the present subject matter.
Figure 9:
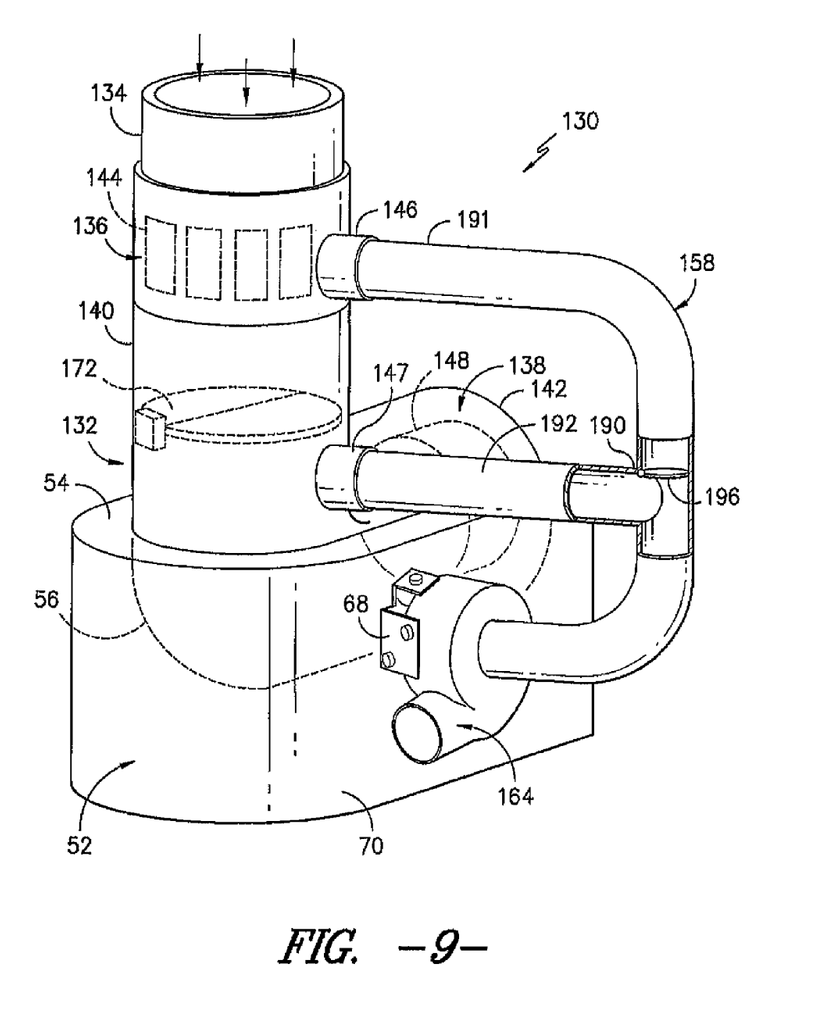
FIG. 9 illustrates a perspective view of one embodiment of a suitable configuration of the air intake system shown in FIGS. 7 and 8.

Referring now to FIGS. 7-9, several views of another embodiment of an air intake system 130 suitable for use with the work vehicle 10 shown in FIG. 1 is illustrated in accordance with aspects of the present subject matter. Specifically, FIG. 7 illustrates a schematic diagram of the air intake system 130 while operating in a normal mode (i.e., cleaning/filtering air as it is supplied to the engine 22) and FIG. 8 illustrates a schematic diagram of the air intake system 120 while operating in a cleaning mode in accordance with aspects of the present subject matter. Additionally, FIG. 9 illustrates a perspective view of a specific embodiment of the air intake system 130 shown in FIGS. 7 and 8.

In general, the air intake system 130 may be configured similarly to the air intake system 30 described and, thus, may include many or all of the same components. For instance, as shown in the illustrated embodiment, the air intake system 130 includes a filter assembly 132 having a pre-cleaner 136 and an air filter 138 disposed downstream of the pre-cleaner 136. As described above, the pre-cleaner 136 and the air filter 138 may be configured to receive dirty air from an intake duct 134 coupled to the filter assembly and clean/filter such air for subsequent delivery to the engine 22. For instance, the pre-cleaner 136 may include one or more of tubes (e.g., turbo tubes), dirt separators, and/or any other suitable pre-cleaner elements 144 configured to separate particulates from the air via centripetal force. The particulates may then be expelled from the filter assembly 132 via a first outlet port 146 defined along the outer perimeter of the pre-cleaner 136 (e.g., by being defining through a pre-cleaner housing 140 of the pre-cleaner 136). Similarly, the air filter 138 may generally include one or more filter elements 148 configured to catch or trap the remaining particulates contained within the cleaned air flowing from the pre-cleaner 136. The cleaned/filtered air may then be directed through a suitable conduit 50 to the engine 22, where the air may be mixed with fuel and combusted.

However, unlike the embodiment described above, the air intake system 130 may also include a second outlet port 147 defined in the filter assembly 132. For example, as shown in the illustrated embodiment, the second outlet port 147 is defined along the outer perimeter of the air filter 138, such as by defining the second outlet port 147 through a filter housing 142 of the air filter 138. As will be described below, a vacuum may be applied to the second outlet port 147 when the air intake system 130 is operating in a cleaning mode to evacuate any particulates trapped within the filter assembly 132.

Additionally, in several embodiments, the air intake system 130 may also include a blower 164 in fluid communication with the first and second outlet ports 146, 147 via one or more conduits. For instance, as shown in the illustrated embodiment, a single, continuous conduit 158 may be coupled between the first and second outlet ports 146, 147 and the blower 164. In such an embodiment, the conduit 158 may include a forked section 190 at which the air flow through the conduit 158 is split between a first portion 191 (extending between the forked section 190 and the first outlet port 146) and a second portion 192 of (extending between the forked section 190 and the second outlet port 147). However, in other embodiments, two or more conduits may be coupled together between the blower 164 and the outlet ports 146, 147 to allow the vacuum generated by the blower 164 to be applied to such port(s). For instance, in an alternative embodiment, a first conduit may be coupled between the first outlet port 146 and a flow splitter (e.g., a two-way conduit splitter), a second conduit may be coupled between the second outlet port 147 and the flow splitter and a third conduit may be coupled between the flow splitter 191 and the blower 164.

It should be appreciated that the conduit(s) 158 may generally be any suitable tube(s), hose(s), pipe(s), duct(s) and/or any other conduit-like member(s) defining a passageway for the flow of air/fluid. Similarly, the blower 164 may generally be any suitable blower or aspirator known in the art that is capable of providing the functionality described herein, such as an electric centrifugal blower, Additionally, similar to the embodiment described above, the blower 164 may be configured to be electronically controlled via the controller 66 of the work vehicle 10.

In general, the blower 164 may be configured to generate a vacuum to be applied to the first outlet port 146 and/or the second outlet port 147 in order to suck particulates out of the filter assembly 132. In several embodiments, the air intake system 130 may include one or more particulate valves 194, 195 coupled between the blower 164 and the outlet ports 146, 147 to control the flow of particulates from the filter assembly 132. Specifically, as shown in FIGS. 7 and 8, a first particulate valve 194 may be coupled between the first outlet port 146 and the blower 164 (e.g., at a location between the first outlet port 146 and the conduit split/fork that separates the flow between the outlet ports 146, 147) to allow the flow through the first outlet port 146 to be controlled. Specifically, when the first particulate valve 194 is opened, the vacuum generated by the blower 164 may be applied to the first outlet port 146 to allow particulates to be sucked through such port. However, when the first particulate valve 194 is closed, the fluid path defined between the first outlet port 146 and the blower 164 may be closed such that the vacuum generated by the blower 164 is not applied to the first outlet port 146. Additionally, as shown, a second particulate valve 195 may be coupled between second outlet port 147 and the blower 164 (e.g., at a location between the second outlet port 147 and the conduit split/fork that separates the flow between the outlet ports 146, 147) to allow the flow through the second outlet port 147 to be controlled. Specifically, when the second particulate valve 195 is opened, the vacuum generated by the blower 164 may be applied to the second outlet port 147 to allow particulates to be sucked through such port. However, when the second particulate valve 195 is closed, the fluid path defined between the second outlet port 147 and the blower 164 may be closed such that the vacuum generated by the blower 164 is not applied to the second outlet port 147.

It should be appreciated that the particulate valves 194, 195 may generally have any suitable configuration that allows each valve to function as described herein. For instance, in several embodiments, the particulate valves 194, 195 may be configured the same as or similar to the air valve 72 described above, such as by being configured as a butterfly valve (FIG. 5) or a flap valve (FIG. 6). However, in other embodiments, the particulate valves 194, 195 may have any other suitable configuration. Additionally, in several embodiments, the particulate valves 194, 195 may be communicatively coupled to the vehicle's controller 66, thereby allowing each valve to be electronically controlled. As such, the particulate valves 194, 195 may be automatically opened and closed to control the flow of particulates through each outlet port 146, 147.

It should also be appreciated that, although the air intake system 130 is shown in FIGS. 7 and 8 as including two particulate valves 194, 195, the air intake system 130 may generally include any number of particulate valves. For instance, as shown in FIG. 9, a single particulate valve 196 may be positioned at the forked location of the conduit(s) 158 (e.g., within the forked section 190 of the conduit 158). In such an embodiment, the particulate valve 196 may, for example, be configured such that, when actuated to a first position, the flow path to the first outlet port 146 is opened and the flow path to the second outlet port 147 is closed and, when actuated to a second position, the flow path to the first outlet port 146 is closed and the flow path to the second outlet port 147 is opened.

Additionally, as shown in the illustrated embodiment, the air intake system 130 may also include an air valve 172 disposed between the pre-cleaner element(s) 144 of the pre-cleaner 136 and filter element(s) 148 of the air filter 138. For example, as particularly shown in FIGS. 7 and 8, the air valve 172 is positioned within filter housing 142 downstream of the pre-cleaner 136 and upstream of the second outlet port 147. Similar to the air valve 72 described above, the air valve 172 may generally be configured to regulate the flow of air through the filter assembly 132 and, thus, may be movable between an open position (FIG. 7) and a closed position (FIG. 8). For instance, as shown in FIG. 7, the air valve 172 may be moved to an open position to allow air to flow through the filter assembly 132 in an intake direction (i.e., such that air flows from the pre-cleaner 136 and through the air filter 138 towards the engine 22). However, as shown in FIG. 8, when moved to the closed position, the air valve 172 may entirely or substantially seal the filter assembly 132, thereby preventing air from flowing from the pre-cleaner 136 to the air filter 138.

It should be appreciated that the air valve 172 may generally have any suitable configuration that allows it to function as described herein. For instance, as described above, the air valve 172 may, in several embodiments, be configured as a butterfly valve (FIG. 5) or a flap valve (FIG. 6). In other embodiments, the air valve 172 may have any other suitable configuration. Additionally as indicated above, the air valve 172 may be configured to be electronically controlled via the vehicle's controller 66, such as by controlling an actuator 84 (FIGS. 5 and 6) associated with the air valve 172. As such, the air valve 172 may be automatically moved between the opened and closed positions.

During normal operation (i.e., when the work vehicle 10 is being operated and the engine 22 is running), the air valve 172 may be maintained in the open position. Additionally, the first particulate valve 194 may be opened and the second particulate valve 195 may be closed. Thus, as shown in FIG. 7, dirty air received within the intake duct 134 may flow into the filter assembly 132 to allow such air to be cleaned and filtered via the pre-cleaner 136 and the air filter 138. The cleaned/filtered air may then exit the filter assembly 132 (e.g., via conduit 50) and flow into the engine 22. Additionally, by opening the first particulate valve 194 such that the vacuum generated by the blower 164 is applied to the first outlet port 146, any particulates flowing along the inner wall of the pre-cleaner housing 140 may be sucked through the first outlet port 146 for subsequent discharge into the outside environment.

Moreover, when the air intake system 130 is operated in its cleaning mode (i.e., after the engine 22 is shutdown), the air valve 172 may be moved to the closed position. Additionally, the second particulate valve 195 is opened while the first particulate valve 194 is closed to allow any particulates trapped within the air filter 138 to be removed via the blower 164. Specifically, in several embodiments, the blower 164 may be operated for a given amount of time after the engine 22 is shutdown to allow the air filter 138 to be cleaned. For example, as shown in FIG. 8, by closing the air valve 172 and opening the second particulate valve 195, the airflow through the filter assembly 132 may be reversed relative to the intake direction (i.e., by flowing away from the engine 22 through the air filter 138 and back towards the second outlet port 147). As a result, particulates trapped within the air filter 138 (e.g., along an upstream side 174 of the air filter 138) may be knocked loose from the filter 138 and evacuated from the filter assembly 132 via the second outlet port 147.

It should be appreciated that the present subject matter is also directed to a method for operating an air intake system 30, 130 of a work vehicle 10, wherein the system 30, 130 includes a filter assembly 32, 132 having a pre-cleaner 36, 136 and an air filter 38 138, an air valve 72, 172 movable between an opened position and closed position and a blower 64, 164 in fluid communication with at least one outlet port 46, 146, 147 defined in the filter assembly 32, 132. The method may include moving the air valve 72, 172 to an opened position when an engine 22 of the work vehicle 10 is running such that an airflow is directed in an intake direction through the filter assembly 32, 132 and into the engine 22 and generating a vacuum with the blower 64, 164 such that particulates separated from the airflow within the pre-cleaner 36, 136 are expelled from the filter assembly 32, 132 through the at least one outlet port 46, 146, 147. In addition, the method may include continuing to operate the blower 64, 164 once the engine 22 is shut down and moving the air valve 72, 172 to the closed position such that the airflow is directed in a reverse direction through the filter assembly 32, 132 and is expelled from the filter assembly 32, 132 via the at least one outlet port 46, 146, 147.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air intake system for a work vehicle, wherein ambient air is taken into the air intake system, the air intake system comprising:
    a filter assembly including a pre-cleaner and an air filter, the filter assembly defining at least one outlet port;
    an air valve movable between an opened position and a closed position; and
    a blower coupled to the at least one outlet port via a conduit, the blower being configured to create a vacuum within the conduit such that particulates are removed from the filter assembly through the at least one outlet port,
    wherein, when the air valve is in the opened position, an airflow is directed through the filter assembly in an intake direction from the pre-cleaner through an upstream side of the air filter such that particulates separated from the airflow within the pre-cleaner are expelled from the filter assembly through the at least one outlet port and, when the engine is turned off and the air valve is in the closed position, the airflow is directed through the air filter in a reverse direction such that particulates are directed from the upstream side of the air filter and are expelled from the filter assembly through the at least one outlet port.

2. The air intake system of claim 1, wherein the air valve is positioned upstream of the pre-cleaner.

3. The air intake system of claim 2, wherein the air valve is located within an intake duct of the air intake system.

4. The air intake system of claim 2, wherein the at least one outlet port is defined along an outer perimeter of the pre-cleaner.

5. The air intake system of claim 1, wherein the pre-cleaner includes at least one pre-cleaner element and the air filter includes at least one filter element, the air valve being positioned between the at least one pre-cleaner element and the at least one filter element.

6. The air intake system of claim 5, wherein the at least one outlet port comprises a first outlet port and a second outlet port, the first outlet port being defined along an outer perimeter of the pre-cleaner and the second outlet port being defined between the air valve and the at least one filter element.

7. The air intake system of claim 6, wherein, when the air valve is in the opened position, the particulates separated from the airflow within the pre-cleaner are expelled from the filter assembly through the first outlet port and, when the air valve is in the closed position, the particulates are directed from the upstream side of the air filter through the second outlet port.

8. The air intake system of claim 7, further comprising at least one particulate valve coupled between the first and second outlet ports and the blower, the at least one particulate valve being configured such that, when the air valve is in the opened position, the vacuum generated by the blower is applied to the first outlet port and, when the air valve is in the closed position, the vacuum generated by the blower is applied to the second outlet port.

9. The air intake system of claim 1, further comprising an actuator associated with the air valve and a controller communicatively coupled to the actuator, the controller being configured to control the operation of the actuator such that the air valve is moved between the open and closed positions.

10. A method for operating an air intake system for a work vehicle, the air intake system intaking an ambient air flow and including a filter assembly having a pre-cleaner and an air filter and an air valve movable between an opened position and closed position, the air intake system further including a blower in fluid communication with at least one outlet port defined in the filter assembly, the method comprising:
    moving the air valve to the opened position when an engine of the work vehicle is running such that an airflow is directed in an intake direction from the pre-cleaner through an upstream side of the air filter and into the engine;
    generating a vacuum with the blower such that particulates separated from the airflow flowing through the pre-cleaner in the intake direction are expelled from the filter assembly through the at least one outlet port;

shutting down the engine:

continuing to operate the blower once the engine is shutdown; and moving the air valve to the closed position such that the airflow is directed in a reverse direction through the air filter and into the at least one outlet port so as to direct particulates from the upstream side of the air filter in the reverse direction and expel the particulates from the filter assembly through the at least one outlet port.

11. The method of claim 10, wherein the air valve is positioned upstream of the pre-cleaner and the at least one outlet port is defined along an outer perimeter of the pre-cleaner, the airflow being directed in the reverse direction through the air filter and being expelled through the at least one outlet port when the air valve is moved to the closed position.

12. The method of claim 10, wherein the air valve is positioned between a pre-cleaner element of the pre-cleaner and a filter element of the air filter, the at least one outlet port comprising a first outlet port and a second outlet port, the first outlet port being defined along an outer perimeter of the pre-cleaner and the second outlet port being defined between the air valve and the filter element, the airflow being directed in the reverse direction through the air filter and into the second outlet port when the air valve is moved to the closed position.

13. The method of claim 12, wherein the particulates separated from the airflow within the pre-cleaner are expelled from the filter assembly through the first outlet port when the air valve is in the opened position.

14. The method of claim 12, wherein at least one particulate valve is coupled between the first and second outlet ports and the blower, the method further comprising:

controlling the operation of the at least one particulate valve such that the vacuum is applied to the first outlet port when the air valve is in the opened position; and controlling the operation of the at least one particulate valve such that the vacuum is applied to the second outlet port when the air valve is in the closed position.

15. A work vehicle, comprising:

an engine; and an air intake system configured to supply clean air to the engine, the air intake system comprising:

a filter assembly including a pre-cleaner and an air filter, the filter assembly defining at least one outlet port;

an air valve movable between an opened position and a closed position; and a blower coupled to the at least one outlet port via a conduit, the blower being configured to create a vacuum within the conduit such that particulates are removed from the filter assembly through the at least one outlet port, wherein, when the air valve is in the opened position, an airflow from an ambient air source is directed through the filter assembly in an intake direction through an upstream side of the air filter towards the engine such that particulates separated from the airflow within the pre-cleaner are expelled from the filter assembly through the at least one outlet port and, when the air valve is in the closed position and the engine is turned off, the airflow is directed through the filter assembly in a reverse direction through the air filter away from the engine such that particulates are directed from the upstream side of the air filter and expelled from the filter assembly through the at least one outlet port.

16. The work vehicle of claim 15, wherein the air valve is positioned upstream of the pre-cleaner and wherein the at least one outlet port is defined along an outer perimeter of the pre-cleaner.

17. The work vehicle of claim 15, wherein the pre-cleaner includes at least one pre-cleaner element and the air filter includes at least one filter element, the air valve being positioned between the at least one pre-cleaner element and the at least one filter; and wherein the at least one outlet port comprises a first outlet port and a second outlet port, the first outlet port being defined along an outer perimeter of the pre-cleaner and the second outlet port being defined between the air valve and the at least one filter element.

18. The work vehicle of claim 17, wherein, when the air valve is in the opened position, the particulates separated from the airflow within the pre-cleaner are expelled from the filter assembly through the first outlet port and, when the air valve is in the closed position, the particulates are directed from the upstream side of the air filter through the second outlet port.

19. The work vehicle of claim 17, further comprising at least one particulate valve coupled between the first and second outlet ports and the blower, the at least one valve being configured such that, when the air valve is in the opened position, the vacuum generated by the blower is applied to the first outlet port and, when the air valve is in the closed position, the vacuum generated by the blower is applied to the second outlet port.

* * * * *